June 28, 1927.  1,633,793

F. PORST

GEAR PUMP

Filed Jan. 25, 1924

Inventor:
Frederic Porst
Williams Bradbury
McCabe & Pierce Attys.

Patented June 28, 1927.

1,633,793

UNITED STATES PATENT OFFICE.

FREDERIC PORST, OF CHICAGO, ILLINOIS, ASSIGNOR TO HARDINGE BROTHERS, INC., A CORPORATION OF ILLINOIS.

GEAR PUMP.

Application filed January 25, 1924. Serial No. 688,463.

My invention relates to improvements in gear pumps, and is concerned with the provision of a gear pump of novel construction, particularly adapted for pumping liquids.

The objects of my invention are:

First, to provide a gear pump particularly adapted for pumping liquids, which is quiet in operation and requires a minimum amount of power for operation, and is simple in construction;

Second, to provide a gear pump of the character described, comprising means for venting or permitting the escape of liquid trapped between the teeth of the gears forming the pump; and Third, to provide a pump such as described, in which the venting passageways are formed in the gears themselves.

Other objects of my invention will appear as this description progresses, reference being had to the accompanying drawings, in which Figure 1 is a plan of a gear pump embodying my invention, portions of the casing being broken away for the purpose of better illustration;

Figure 1:
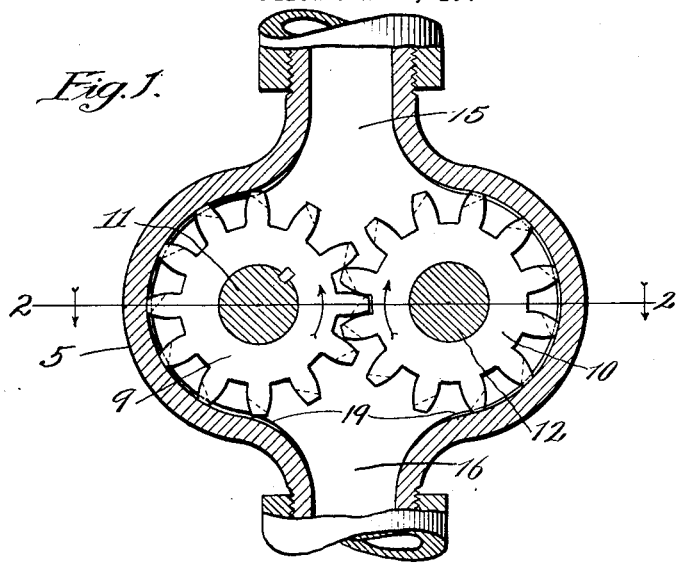
Figure 2:
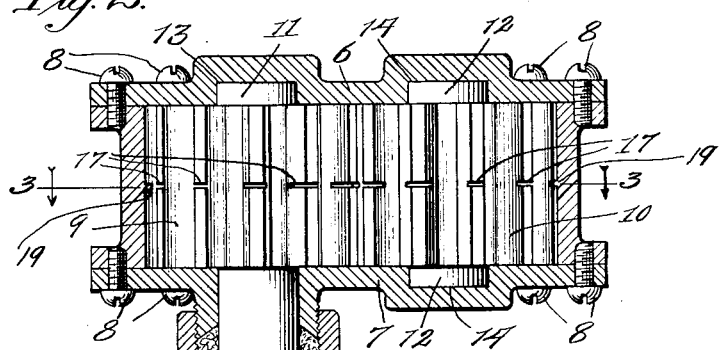
Figure 2 is a vertical transverse section taken on line 2—2 of Figure 1.

In the drawings, I have illustrated my invention as being embodied in a gear pump comprising a suitably shaped housing 5 having the end plates 6 and 7, which are secured to the housing 5 by means of screws 8 or in any other suitable manner. The two gears 9 and 10 are provided with suitable shafts 11 and 12 respectively. One end of the former and both ends of the latter shaft are journaled in suitable depressions 13 and 14 formed in the cover plates. The other end of the shaft 11 projects outwardly through the cover plate 7, and may be connected with a suitable source of power in any desired manner. Reference character 15 indicates the suction side of the pump, and the reference character 16 indicates the discharge side.

Each of the teeth of the gears 9 and 10 have slots extending transversely and intermediate the ends thereof. The slot 17 in each tooth extends from a point on the leading face of the tooth adjacent the end thereof to a point lying substantially on the pitched circle of the trailing face of the tooth at approximately the pitched diameter thereof. This means that the slot increases in depth toward the high pressure side of the pump.

Figure 3:
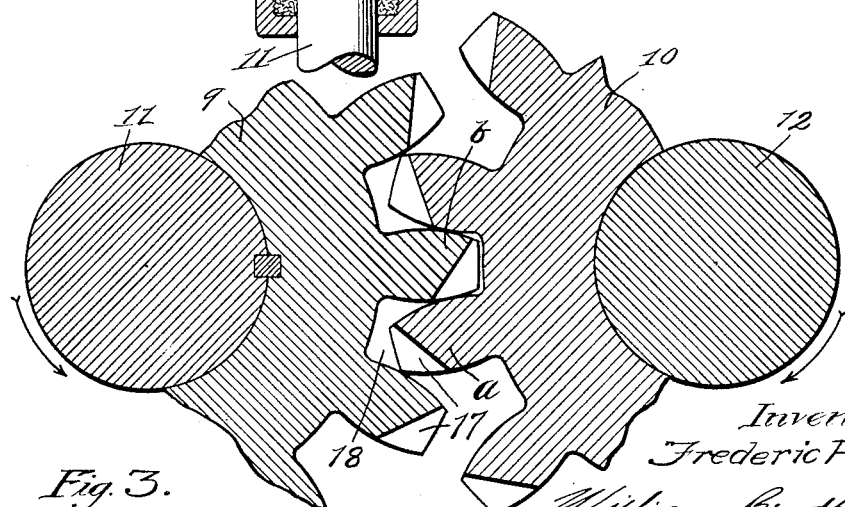
Figure 3 is an enlarged horizontal sectional detail taken on line 3—3 of Figure 2.

From an inspection of Figure 3, it will be noted that if the slot 17 in the tooth a were not provided, there would be a tendency to compress the liquid in the pocket 18 formed between the meshing teeth of the two gears, and that if no means were provided for permitting the escape of the liquid from this pocket, the pump would be locked against operation. However, by providing the notch 17, a passageway is open for the escape of fluid from the pocket 18 to the pressure side of the pump. By reason of the tapered shape of the slot 17, it remains open to the pressure side of the pump until the tooth occupies a position on the center line of the two gears, so that means are provided for permitting the escape of liquid from the pockets 18 which are successively formed by the meshing of the gear teeth, until the teeth are in positions where there is no longer any tendency to compress the liquid in these pockets. Nevertheless, when the teeth reach a position on the center line between the two gears, such as occupied by the tooth b there is a complete seal between the high and low pressure sides of the pump, so that it is impossible for any liquid to leak backward past the meshing teeth.

Leakage from the high pressure side of the pump back through the notches 17 of the teeth which are in contact with the walls of the housing 5 may be prevented by ribs or fins 19 projecting from the inner walls of the housing 5. However, in view of the considerable number of these notches to which the liquid must pass, and the fact that they are quite small in cross section, it is possible to dispense with the ribs or fins 19 without seriously affecting the efficiency of the pump.

Improved means which I provided for venting the pockets formed between the teeth of the gears enables me to make use of true involute gear teeth on the gears, thereby reducing the noise of operation and the power required for operating the pump. The size of the slots 17 depends upon the size of the gears, the amount of liquid to be pumped per unit of time, the viscosity of the liquid, and certain other factors which makes it more easy properly to determine the size of the slot by the cut and dried method, than to attempt to calculate it.

While I have described the details of construction of the preferred embodiment of my invention, it is to be clearly understood that my invention is not limited to these details of construction, but is capable of other adaptations and modifications within the scope of the appended claims.

Having thus described my invention, what I claim is:

1. A gear pump comprising a pair of meshing involute gears, the teeth of said gears each having a slot therein extending from a point on the leading face of and adjacent the end of said tooth, to a point on the trailing face of said tooth adjacent the pitched circle thereof.

2. A gear pump comprising a pair of meshing gears, the teeth of said gears each having a passageway formed therein for venting liquid trapped between the teeth of said gears, said passageway being of larger cross-section on the discharge side of said pump than on the suction side.

3. A gear pump comprising a pair of meshing spur gears, the teeth of said gears each having a slot therein, said slot being in the portion of the tooth outside of the pitch circle of said gears.

4. A gear pump comprising a pair of meshing involute spur gears, the teeth of said gears having passageways therein, said passageways being in the portions of said teeth lying beyond the base circles of said gears.

In witness whereof, I hereunto subscribe my name this 3rd day of January, 1924.

FREDERIC PORST.